Sept. 22, 1942.    G. H. REID    2,296,798
SPINDLE BEARING
Filed June 25, 1941
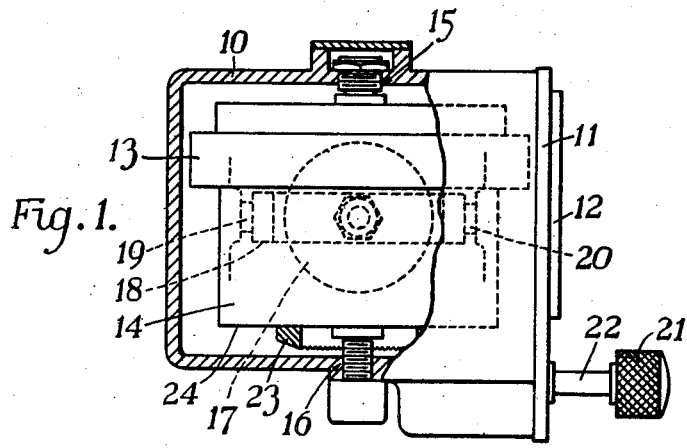
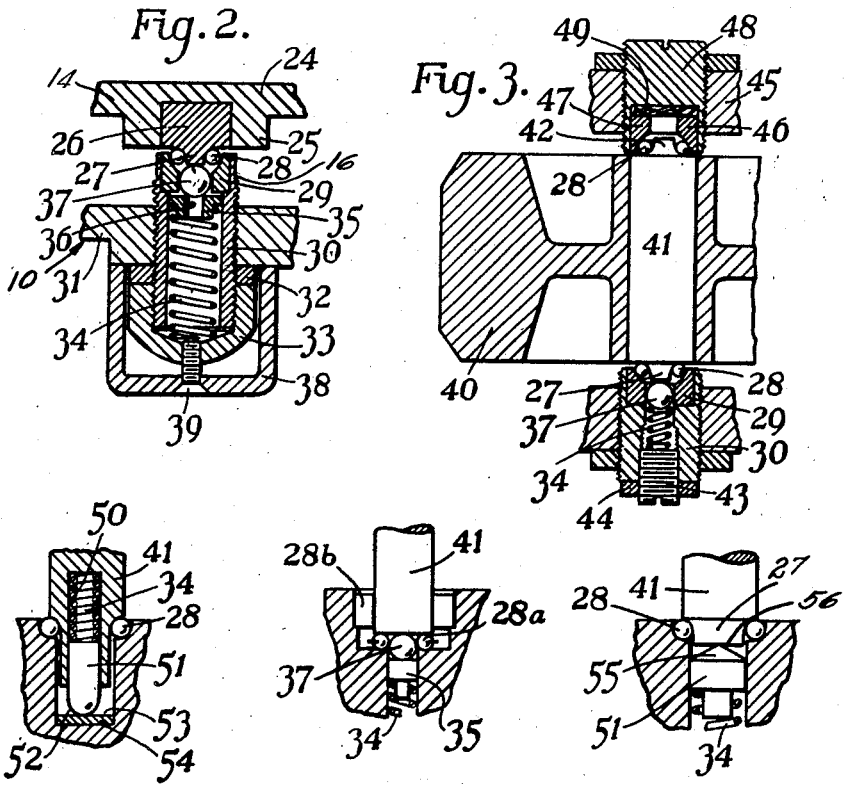
Inventor:
G. H. Reid
By: Stevens and Davis
Attys.

Patented Sept. 22, 1942

2,296,798

UNITED STATES PATENT OFFICE 2,296,798

SPINDLE BEARING

George Hancock Reid, London, England

Application June 25, 1941, Serial No. 399,722
In Great Britain April 19, 1940

9 Claims. (Cl. 308—159)

This invention relates to spindle bearings in general, but more particularly to bearings for instruments such as gyroscopic direction indicators, rate of turn indicators and the like.

It is the primary object of the invention to provide an improved form of spindle bearing which is found to give efficient results in practice, more particularly with respect to reduction in running friction.

In a spindle mounting which is provided with means for taking radial bearing loads and separate means adapted to resist axial displacement of the spindle, according to the present invention a resilient device is provided which bears in an axial direction upon the spindle through the medium of the said separate means.

Further, according to the invention a spindle mounting comprises in combination with a main bearing adapted to resist thrust in an axial direction, an auxiliary thrust bearing which is urged by resilient means to reduce the axial loading on the main bearing.

According to another aspect of the invention a mounting for a rotatable member having a normal load in the direction of the axis of rotation, comprises a main bearing arranged to resist said normal axial load, and an auxiliary thrust bearing which is spring urged into engagement with the rotatable member so that said auxiliary thrust bearing takes substantially the whole of the said normal axial load of the spindle.

There is further provided according to the invention a mounting for a rotatable member comprising in combination, a hollow socket forming one ball race, a shouldered spigot forming a complementary ball race, balls operating between said races so as to act as an anti-friction bearing for radial loads, and for axial loads in one direction, an auxiliary thrust bearing, also operating between the socket and the spigot, and resilient means which are interposed between the auxiliary thrust bearing and the socket so as to cause said auxiliary thrust bearing to take a large proportion of the normal axial load. Alternatively the resilient means may be interposed between the auxiliary thrust bearing and the spigot.

Preferably the auxiliary bearing comprises a thrust member which engages with a relatively rotatable member at a localized position, which latter coincides with the axis of rotation, said member conveniently having a spherical surface engaging with a relatively rotatable member, the centre of the sphere to which the said surface conforms being disposed upon the axis of rotation. In the preferred constructions the auxiliary thrust bearing comprises a complete ball, usually composed of hardened steel. This ball may be maintained with its centre coincident with the axis of rotation, by a plunger member having a recess, the rim of which engages with the ball. The resilient means for determining the maximum load on the auxiliary thrust bearing may be adjustable.

According to another aspect of the invention a gyroscopic instrument is provided having a member mounted to rotate about a substantially vertical axis, characterised by the fact that the lower bearing of said member comprises a main bearing arranged to take radial and axial loads, and a light anti-frictional thrust bearing which is resiliently loaded in an axial direction so that it removes substantially the whole of the normal axial load from the main bearing, and thus reduces the operating friction of said bearing. The upper part of the rotatable member can conveniently be carried in a bearing which is bodily slidable axially in its housing and is urged resiliently downwards by a spring, primarily in order to compensate for the effects of temperature changes, thus preventing the working parts from becoming jammed due to differential expansion and contraction of the spindle, its bearings, and the gimbal frame, instrument body, or other member carrying said bearings.

The invention is illustrated by way of example in the accompanying diagrammatic drawing, in which:

Figure 1 is a side elevation of a gyroscopic direction indicator, the casing being shown partly in section;

Figure 2 is a sectional elevation to an enlarged scale of the lower bearing of the indicator drum shown in Figure 1;

Figure 3 is a fragmentary sectional view of a gyro wheel and its mounting suitable for use in the type of navigating instrument known as the gyroscopic artificial horizon; and Figures 4, 5, and 6 are diagrammatic sectional elevations showing some possible variations in the arrangement of the parts.

The direction indicator shown in Figure 1 comprises an outer casing 10 provided with the usual front 11 and dial frame 12, through which latter the calibrated markings (not shown) upon the ring 13 are rendered visible. The ring 13 is carried by a substantially cylindrical drum 14, which latter is mounted in upper and lower bearings so that normally it is quite free to revolve relative to the casing. These upper and lower bearings are indicated generally at 15 and 16 respectively in Figure 1. It will be appreciated, of course, that when the instrument is in use the drum 14 actually remains quite stationary as far as its angular position is concerned, so that it is the movements of the casing 10 which is secured to the aircraft or equivalent that are shown by the observed readings. The drum 14 is caused to remain stationary in this way owing to the provision of a gyro rotor 17 carried by a gimbal frame 18, which latter is mounted upon bearings 19 and 20 so as to be free to rock within the drum 14. The gyro rotor 17 is of course provided with suitable driving means (not shown) such, for instance, as one or more air jets, and in instruments of this type it is normally equipped with a caging device (not shown) for the purpose of setting the gimbal frame 18 so that the axis of the gyro rotor 17 lies truly at right angles to the axis of rotation of the drum 14. These parts of the instrument are quite well known in the art and form no part of the present invention. This applies also to the means for setting the drum 14 so that the ring 13 shows, through an aperture in the dial, an indication which is appropriate to the prevailing position of the aircraft or equivalent. For this purpose a knob 21 upon a spindle 22 is adapted to be pressed in so that a bevel pinion (not shown) upon the spindle 22 is brought into engagement with a bevel crown wheel 23 carried upon the bottom 24 of the drum 14; turning of the knob 21 then changes the angular position of the drum 14, and when the desired setting is obtained the knob 21 is pulled out again.

In order that the position of the drum 14 may be interfered with to the minimum extent by movements of the casing 10 about a vertical axis, it is important that the operating friction in the bearings 15 and 16, particularly the latter, should be rendered as small as possible, and with this end in view the improved construction of mounting shown in Figure 2 is used.

The bottom 24 of the drum 14 is formed with a thickened boss 25, which is recessed to accommodate a spindle member 26 composed of hard steel and provided with an axial spigot 27. The surface surrounding the spigot 27 constitutes a race for a circular series of balls 28, which also engage with the interior of a socket-shaped member or race 29, the arrangement being such that the balls 28 constitute the main bearing for the drum 14 and are adapted to take loads which are radial to the axis of the drum 14, as well as loads in a downward axial sense. The socket member 29 is carried by an externally screw-threaded sleeve 30 which is adjustably mounted in the bottom wall 31 of the casing 10, the setting being maintained by a lock nut 32. A cap nut 33 screwed on to the sleeve 30 serves as an abutment for the lower end of a coiled compression spring 34, the upper end of which engages a plunger member 35 arranged to slide accurately but freely within the bore of the sleeve 30. The plunger member 35 has an axial bore or recess 36, the upper end of which serves to support and centralise a hard steel ball 37 accommodated within the lower part of the socket member 29, which latter is annular in shape. The upper part of the ball 37 engages with the flat lower surface of the spigot 27, which surface is ground smooth and/or polished so as to reduce friction to a minimum. The spring 34 thus tends, through the auxiliary thrust bearing constituted by the ball 37, to lift the drum 14 and thus reduce the gravitational load which would otherwise be applied to the main balls 28. By arranging the spring 34 so that substantially the whole of the normal gravitational load is taken by the ball 37, it is found that frictional resistance to movement of the drum 14 relative to the casing 10 is largely eliminated. Any increase in the downward axial load imparted by the drum 14, due, for example, to vibration, or to violent upward acceleration of the aircraft, is taken wholly by the main balls 28, which, in association with their races, are designed to withstand the maximum loads that are likely to occur in practice. A cap 38, secured by a screw 39 to the cap nut 33, produces a neat appearance and, if sealed, prevents unauthorised interference with the adjustment of the bearing. The upper bearing 15 is, of course, of the usual construction and comprises only a set of main balls similar to the balls 28, these being carried between race members similar to 26 and 29.

Figure 3 shows an adaptation of the improved device to a gyro rotor which is mounted so that its axis is normally substantially vertical, as, for example, in the case of gyro rotors used in artificial horizon instruments. The gyro rotor, which is indicated at 40, has a spindle 41 formed at its lower end with a spigot 27 and at its upper end with a spigot 42, each of said spigots being carried by a row of balls 28. The lower surface of the spigot 27 is very smooth and is arranged to be truly at right angles to the axis of the spindle 41 so as to engage in a substantially frictionless manner with a hard steel ball 37 as in the previous example. This ball constitutes the auxiliary thrust bearing, which is resiliently urged upwards by a coiled compression spring 34 so that it normally bears all, or a large proportion, of the weight of the gyro rotor 40 and its spindle 41. The lower end of the spring 34 bears against a grub screw 43, which is arranged to be adjustable relative to the sleeve member 30 and is provided with a lock nut 44, thus enabling the load which is taken by the auxiliary thrust bearing to be readily regulated. Any excessive downward loads are taken as before by a main bearing comprising a set of balls 28 disposed between the spigot 27 and the socket member 29.

With a view to preventing the spindle 41 from becoming jammed, due, for example, to the contraction which occurs when the temperature falls and the supporting frame 45 of the gyro rotor contracts, a socket-shaped race member 46 is mounted so as to be slidable in an axial direction within a recess 47 formed in a screw-threaded upper bearing support 48. The race member 46 is, however, at all times pressed resiliently downwards by a spring washer 49 or equivalent device adapted to keep the parts in close working engagement. If desired, jamming due to change of temperature may be avoided by making the frame 45 of material having the same coefficient of expansion as the spindle 41.

The improved form of mounting is capable of being modified in numerous ways, and some possible variations are indicated in Figures 4 to 6. In Figure 4 the spindle or equivalent member 41 is formed with a longitudinal bore 50 accommodating the coiled compression spring 34 which determines the maximum load that can be taken by the auxiliary thrust bearing. The latter is constituted by a plunger member 51, which slides freely within the bore 50, and is formed at its lower end with a surface 52 which is of hemispherical or other part-spherical shape so as to engage in a relatively frictionless manner with the upper surface 53 of a steel or other hard plate 54. Any downward load in excess of that taken by the auxiliary thrust bearing is imparted to the main bearing comprising a row of balls 28.

In the arrangement shown in Figure 5, which is primarily intended for use where heavy radial loads are likely to occur, the main bearing comprises two portions, namely a circumferential row of balls 28a adapted to take downward thrust, and a series of rollers 28b which act to take the radial loads. As before, the auxiliary thrust bearing comprises a ball 37, which is pressed upwards into engagement with the spindle 41 by a coiled compression spring 34 acting through a plunger member 35.

The modification shown in Figure 6 operates similarly to the construction in Figure 2, but instead of a ball, the auxiliary thrust bearing comprises a plunger member 51 which is formed with a shallow conical projection, the apex of which is pressed resiliently against a smooth, hard and true surface 56 upon the bottom of a spigot 27 at the lower end of the spindle 41.

Although the invention has been described with particular reference to gyroscopic navigating instruments, it will be understood that it is applicable to other cases where it is desired that the operating friction due to an axial load on a shaft, spindle or equivalent rotatable member shall be kept as small as possible, the bearing at the same time being capable of withstanding axial loads much larger than normal when these occur.

What I claim is:

1. In a gyroscopic instrument incorporating in the gyro wheel and gimbal assembly a rotatable spindle member, a spindle mounting comprising a main ball anti-friction thrust bearing arranged to resist axial load in the normal direction, a support member spaced from and in alignment with the end of said spindle member, a bearing element disposed intermediate said support member and the end of said spindle member, and a spring urging said bearing into localized contact with one of said members, the area of contact being exceedingly small and coincident with the axis of rotation of said spindle.

2. In a gyroscopic instrument incorporating in the gyro wheel and gimbal assembly a rotatable spindle member, a spindle mounting comprising a main ball anti-friction thrust bearing arranged to resist axial load in the normal direction, a support member spaced from and in alignment with the end of said spindle member, a rounded bearing element disposed intermediate said support member and the end of said spindle member, and a spring urging the rounded surface of said bearing element into tangential contact with one of said members, the point of contact being coincident with the axis of rotation of said spindle.

3. In a gyroscopic instrument incorporating in the gyro wheel and gimbal assembly a rotatable spindle member, a spindle mounting comprising a main ball anti-friction thrust bearing arranged to resist axial load in the normal direction, a support member spaced from and in alignment with the end of said spindle member, a spherical bearing element disposed intermediate said support member and the end of said spindle member, and a spring urging said bearing element into tangential contact with the other member, the point of contact being coincident with the axis of rotation of said spindle.

4. In a gyroscopic instrument, a spindle mounting as claimed in claim 2 in which the spring is located between the end of the spindle and the rounded bearing element, and said spring urges the rounded surface of said element into tangential contact with the support member.

5. In a gyroscopic instrument, a spindle mounting as claimed in claim 2 in which the spring is located between the support member and the rounded bearing element, and said spring urges the rounded surface of said element into tangential contact with the end of said spindle.

6. In a gyroscopic instrument having a spindle mounting as claimed in claim 3, further comprising means defining a recess the edges of which retain the spherical bearing element in alignment with the axis of the spindle.

7. In a gyroscopic instrument having a spindle mounting as claimed in claim 1, further comprising means for adjusting the compression of said spring to vary the thrust thereof, whereby compensation for differences in normal load may be made so that the main ball anti-friction bearing may remain substantially unloaded.

8. In a gyroscopic instrument incorporating in the gyro wheel and gimbal assembly a rotatable spindle, a spindle mounting comprising a main ball anti-friction thrust bearing arranged to resist axial load in the normal direction, a support spaced from and in alignment with the end of said spindle, a conical bearing element disposed intermediate said support and the end of said spindle, and a spring urging the apex of said conical bearing element into contact with the end of the spindle, the point of contact being coincident with the axis of rotation of said spindle.

9. In a gyroscopic instrument incorporating in the gyro wheel and gimbal assembly a rotatable spindle, a spindle mounting comprising a main ball anti-friction thrust bearing arranged to resist axial load in the normal direction, a support spaced from and in alignment with the end of the spindle, an auxiliary spherical bearing disposed intermediate said support and the spindle, means carried by a portion of said support defining a cylindrical recess the edges of which retain the spherical bearing in alignment with the axis of the spindle, a spring urging said spherical bearing into tangential contact with the end of said spindle, and means for adjustably compressing said spring to vary the thrust thereof to an extent sufficient to substantially unload said main ball anti-friction thrust bearing.

GEORGE HANCOCK REID.